United States Patent [19]

Huebscher et al.

[11] Patent Number: 4,925,266
[45] Date of Patent: May 15, 1990

[54] OPTICAL SLEEVE OR INSERT APPARATUS

[76] Inventors: Laszlo Huebscher, 22 Woodbridge Ave., New Brunswick, N.J. 08901; Carmen Lanzetta, 2620 Pleasant Rd., Hatboro, Pa. 19040

[21] Appl. No.: 314,689

[22] Filed: Feb. 23, 1989

Related U.S. Application Data

[63] Continuation-in-part of Ser. No. 142,565, Jan. 11, 1988, abandoned.

[51] Int. Cl.⁵ ................................................ G02B 6/36
[52] U.S. Cl. .................................................... 350/96.20
[58] Field of Search ............................ 350/96.20, 96.22

[56] References Cited

U.S. PATENT DOCUMENTS

| | | | |
|---|---|---|---|
| 3,999,837 | 12/1976 | Bowen et al. | 350/96.22 |
| 4,355,862 | 10/1982 | Kock | 350/96.20 |
| 4,447,121 | 5/1984 | Cooper et al. | 350/96.20 |
| 4,666,241 | 5/1987 | Caron | 350/96.21 |

Primary Examiner—William L. Sikes
Assistant Examiner—Phan T. Heartney
Attorney, Agent, or Firm—Caesar, Rivise, Bernstein, Cohen & Pokotilow

[57] ABSTRACT

An insert or sleeve is fabricated from a glass-like material as a mica-filled glass and is of a longitudinal tubular configuration having a flat front surface with an aperture for accommodating a glass optical fiber. The aperture is coextensive with a fiber accommodating channel in said insert. The insert is surrounded and anchored into an outer plastic ferrule and a fiber when accommodated in said channel is broken at said surface which surface and fiber face are then polished to assure an optically smooth and polished fiber face which is free from debris damage during polishing.

18 Claims, 2 Drawing Sheets

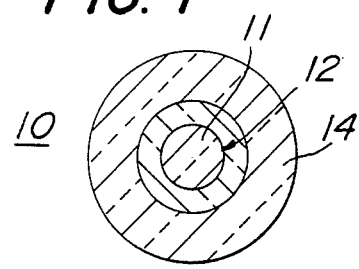
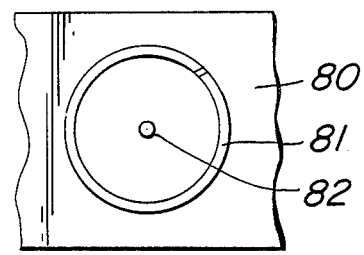
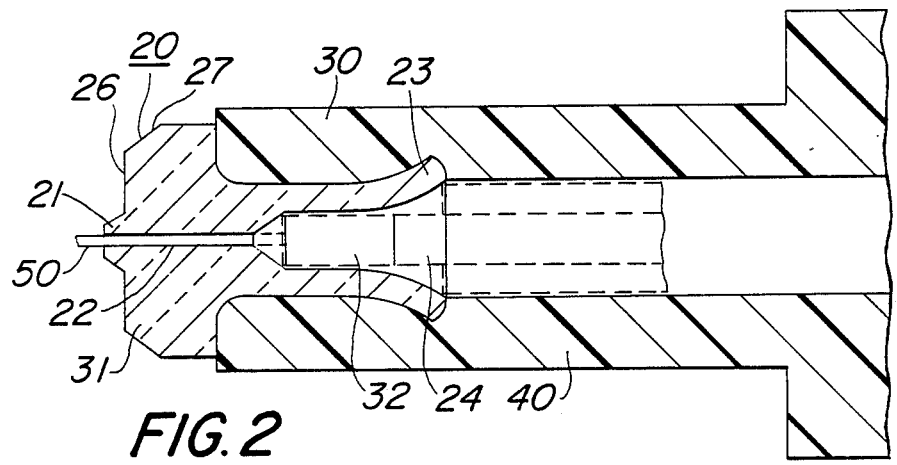
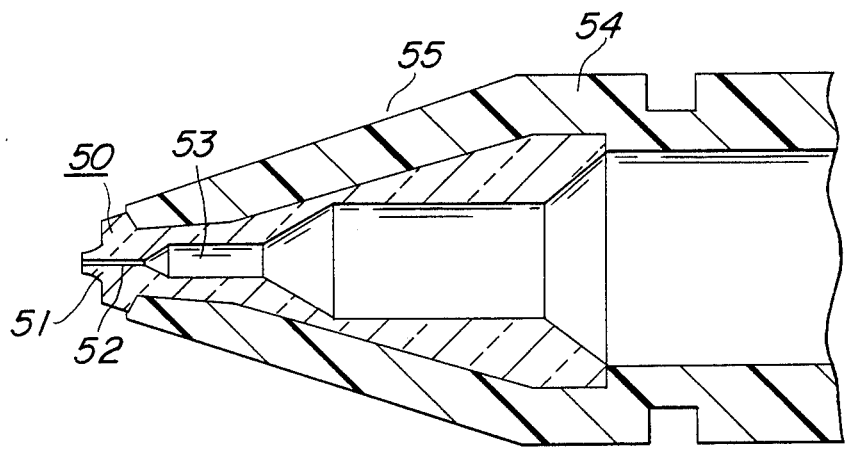

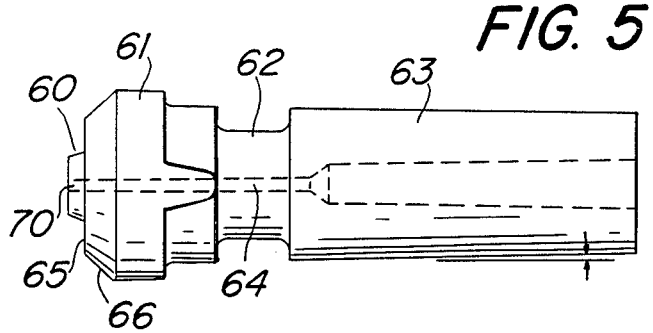
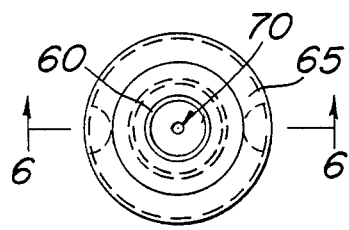
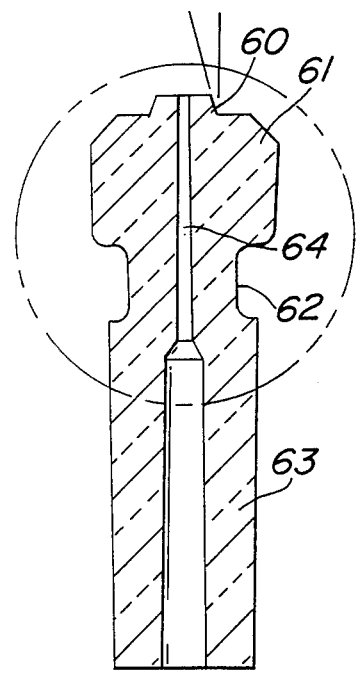
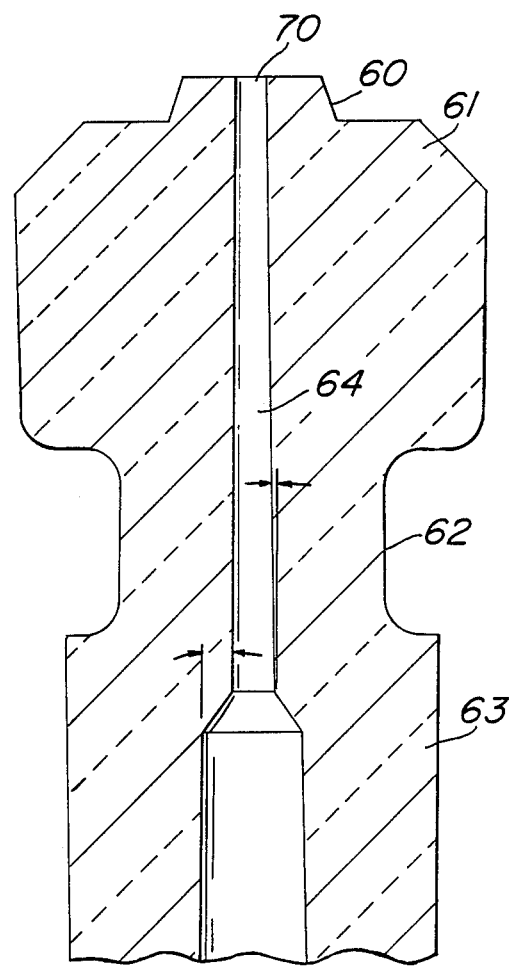

OPTICAL SLEEVE OR INSERT APPARATUS

BACKGROUND OF THE INVENTION

This application is a Continuation-in-Part of our application Ser. No. 07/142,565, filed on Jan. 11, 1988, abandoned on Jan. 11, 1989 entitled Optical Fiber Sleeve or Insert Apparatus, which is assigned to the same assignee as this invention and whose disclosure is incorporated by reference herein.

This invention relates to an optical fiber sleeve or insert apparatus which apparatus maintains a fiber in position and more particularly to an insert apparatus to bne used in conjunction with a ferrule or connector to assure that the accommodated optical fiber will be centrally located with respect to the connector and furthermore to assure that the output surface of the optical fiber is optically smooth and flat. The invention also relates to the method of making the optical fiber insert apparatus and associated ferrule or connector.

Optical fibers are widely employed and are optical waveguides with an inner glass core having a refractive index which exceeds that of a surrounding cladding layer and are capable of conducting an optical ray by means of total internal reflection or guiding.

Optical fibers have been widely employed in the communications field and are employed in various other systems as well. It is apparent that an optical fiber is a glass light conducting guide of a given length and of extremely small diameter and must be terminated by suitable means to enable it to serve as a system component. In this manner various optical fibers or optical links can be connected to other optical fibers or optical links for the efficient transmission of light.

Due to the extremely small dimensions regarding the cross sectional areas of any optical fiber, such connectors pose many problems to the prior art. A major problem in regard to such connectors is the accurate alignment of the optical fiber face within the connector so that the light is efficiently transmitted from one connector to another connector or is efficiently transmitted at a designated source or location.

As one can ascertain, the prior art is replete with numerous examples of optical fibers and the construction of the same. See for example a text entitled *Reference Data For Radio Engineers* published by Howard W. Sams and Co., Inc. a subsidiary of International Telephone and Telegraph Corp. See Chapter 34 entitled "Optical Communications". In that chapter many examples of typical optical fibers are given.

As one will understand, most optical fibers are composed of various glasses. The lowest losses that have been obtained with such glass optical fibers have been obtained from fibers of ultra-pure fused silica. As one can further ascertain, contaminants severely limit the transmitivity of an optical fiber.

Many optical fibers are also fabricated from glass materials which are doped with suitable impurities to achieve different operating characteristics. As is well known, a basic optical fiber consists of an inner or core member which is surrounded by an outer concentric cladding member. This construction enables the propagation of light through the optical fiber as is well known. In order to further protect the optical fiber, there are various combinations of coating materials employed to provide an outer jacket to the fiber for increased strength and utility.

The most usually used coating arrangements comprise a dual layer coated system including an inner layer comprising a relatively soft material to cushion the fiber and reduce microbending losses and an outer layer which usually comprises a much harder material for high strength and abrasion resistance. Examples of inner layer materials include silicones, hot wax materials and soft ultraviolet cured resins. Examples of outer layer materials include thermally cured polymeric materials, hard ultraviolet cured resine and plastics.

As one can understand, the optical fiber basically appears much like an electrical cable and as such is associated with a connector whereby the end face of the optical fiber as terminated at the ferrule or connector must be properly aligned and concentric so that the maximum amount of light can be transmitted to another fiber or an associated optical element. Techniques of holding optical fibers in proper alignment in regard to connectors are wide spread. There are many techniques which employ metal or other suitable materials to interface with the optical fiber and to further assure that the fiber is concentrically positioned so that the maximum light transfer can occur.

These techniques employ watch jewels or various metallic or other elements which serve to hold the optical fiber in position. The adjustments required are elaborate, and oftentimes in order to place an optical fiber in a ferrule, one has to use microscopic techniques to assure geometrical alignment of the fiber. These techniques may include actual computer processing to determine the geometrical center of the fiber with respect to an associated connector or ferrule.

Another problem in regard to the optical fiber is that in order to terminate the end of the fiber, one must assure that the face of the fiber is flat and adequately polished. In this manner the fiber is usually cleaved at the face of the connector or ferrule and then is polished so that the surface is optically flat and smooth. During this polishing procedure, one may contaminate the fiber with the material surrounding the same as for example a metallic material or other material which has non-compatible characteristics with glass. In this manner, when the fiber is emplaced in an insert or a connector, the face of the fiber must be cleaved or precisionally cut and then polished to assure surface uniformity and optical flatness. During this polishing technique, oftentimes the material of the insert such as a metallic material actually abrades, scratches or otherwise contaminates the face of the optical fiber thus damaging the fiber properties and characteristics.

The cleaving process or the cutting of the fiber as inserted in an accommodating channel of an insert is also a difficult process and this must be done with great precision. Hence care is taken to assure that the fiber will not break below or within the insert itself. If this occurs, then one does not have access to the face of the fiber and hence proper alignment as well as proper light transmission cannot occur. Thus, as one can ascertain, the problems of providing inserts or connectors for optical fibers have been investigated in the prior art and there are many examples of such connectors as well as inserts which enable one to hold an optical fiber in proper position.

As indicated above, the above-noted problems are prevalent in most modern day connectors or ferrules.

Suffice it to say that upon a review of such prior art techniques, one will find that most techniques are difficult to implement and have problems in regard to the incompatibility of materials as well as other problems that affect the performance of the fiber both from mechanical and environmental points of view. The incompatibility results in problems with changes in temperature as well as other difficulties due to stresses, vibrations and so on.

OBJECTS OF THE INVENTION

Accordingly, it is a general object of this invention to provide apparatus and a method for maintaining an optical fiber in place and which overcomes the disadvantages of the prior art.

It is another object of the present invention to provide an improved optical fiber sleeve or insert apparatus which operates to firmly secure an optical fiber so that the optical fiber can be concentrically and properly positioned within a connector or ferrule.

It is a further object of the present invention to provide a fiber optic sleeve or insert which enables one to assure that the surface of the optical fiber as terminated will be optically smooth and flat after polishing of the same.

SUMMARY OF THE INVENTION

These and other objects of the instant invention are achieved by providing insert apparatus having a channel for accommodating an optical fiber formed of a first material, e.g., glass, and having a face. The apparatus comprises a tubular member fabricated from a second material, e.g., mica glass, different than the first material but exhibiting compatible properties with that of the first material to enable polishing of the fiber face when the fiber is accommodated in the channel of the insert. Thus, the second material comprises a material which polishes at relatively the same rate as the first material and which provides polishing debris incapable of damaging the optical fiber face. The insert has a front surface of a given size and shape and has an aperture coextensive with the fiber accommodating channel to enable the fiber to be placed in the channel with the face of the fiber positioned at the front surface and polished at the front surface to produce an optically smooth and flat fiber surface. The optically smooth and flat fiber surface is in the same exact plane as the front surface of the insert due to the combined simultaneous polishing of the fiber face and the front surface of the insert.

This invention also entails a method of making a connector support for an optical fiber formed of the first material. The method comprises the steps of forming the tubular insert from the second material, placing the insert within a cavity so that the insert's aperture is centrally located therein, and molding a ferrule about the insert. The ferrule has a longitudinal central axis. The aperture of the insert is located on that axis. The optical fiber is placed within the insert's channel so that the fiber's face is located adjacent the front surface of the insert. The front surface of the insert and the fiber's face are polished simultaneously to achieve the optically smooth and flat fiber surface at the front surface of the insert.

DESCRIPTION OF THE DRAWING

FIG. 1 is a front cross-sectional view of a typical glass optical fiber.

FIG. 2 is an enlarged side cross-sectional view of a fiber accommodating assembly including a ferrule and an anchored insert according to this invention.

FIG. 3 is an enlarged side cross-sectional view of an alternate embodiment of a fiber accommodating assembly.

FIG. 4 is a front plan view of an insert according to this invention.

FIG. 5 is a side plan view of the insert shown in FIG. 4.

FIG. 6 is an enlarged sectional view of the insert taken along line A—A of FIG. 4.

FIG. 7 is an enlarged view of a portion of the insert as shown by the circular outline of FIG. 6.

FIG. 8 is a front plan view of a portion of a mold used for fabricating the insert of this invention.

DETAILED DESCRIPTION OF THE PREFERRED EMBODIMENT

Referring to FIG. 1, there is shown a cross-sectional view of a typical optical fiber 10.

The optical fiber as indicated has an inner core 11 which is surrounded by a cladding layer 12 to enable the propagation of optical frequencies. Typically, the core 11 as well as the cladding layer 12 are fabricated from different types of glasses having different types of impurities or from pure glass, all of which are well known.

It is a major aspect that the core and cladding layer have a different index of refraction. The cladding layer 12 may also include an outer substrate layer which is further used to protect the fiber. In order to assure greater mechanical rigidity, the combined cladding and substrate layer 12 is usually coated with an outer sheathing layer 14. This sheathing layer may consist of many materials including various plastics as well as the various materials indicated in the Background of the Invention. The sheathing or jacket may consist of multiple layers as two concentric layers and so on.

The present invention regarding the termination of an optical fiber will accommodate any type of optical fiber such as graded index fiber, a single mode fiber or various other optical fibers, all of which are known in the prior art.

Shown in FIG. 2 is a cross-sectional view of a typical insert 20 according to this invention. The insert 20 as seen in FIG. 2 is of a cylindrical or suitable geometrical cross section and has a front surface 26 which is relatively flat. The insert 20 is a longitudinal tubular member having an internal fiber accommodating channel or passageway 22 dimensioned to receive a bare fiber. The channel 22 is coextensive and coaxial with a larger channel 32 for accommodating the jacketed fiber and has a back opening for insertion of the fiber. The front surface 26 contains an integrally upstanding concentrically formed flange 21 which flange 21 has an aperture communicating with the internal channel 22. As indicated, the channel 22 is dimensioned so that it can accommodate the optical fiber after the jacket 14 has been removed from the fiber.

The front-end section 31 of the insert includes the large front surface area 26 which contains a peripheral flange 27. The internal hollow section 32 is dimensioned so that it can adequately receive the outer jacket of the fiber. The insert member 20 contains a rear portion which includes a flared portion 23 which as will be explained operates as anchoring means to firmly locate the insert within a surrounding plastic cylindrical connector or ferrule 40.

As will be explained, the plastic ferrule 40 is fabricated during a molding process in which the insert is accurately located within a suitable mold by means of the channel 22 and the corresponding aperture. As one will understand, it is of prime importance in regard to a connector that the geometrical center of the optical fiber as accommodated within the insert is in the exact geometrical center of the connector 40. As will be explained, this is accommodated during the molding process.

As one can ascertain from FIG. 2, a typical optical fiber such as that shown in FIG. 1 has the jacket 14 first removed so that a portion of the fiber is bared. The portion of the fiber that is bare is a function of the length of the channel 22 which is typically 3 millimeters in length. Removal of the outer jacket or the mechanical stripping of the fiber jacket can be accomplished by many techniques.

As indicated, a typical optical fiber is jacketed by means of a suitable elastomeric material which provides protection and support to the fiber assembly. The jacket may be mechanically stripped from the fiber by employing a sharp blade or other device. This may be followed by an ultrasonic cleaning step to remove the remnants of the jacket in a suitable solvent. One can also, for example, use a selective etching to further remove the substrate layer which is associated with the cladding layer. In any event, this is not necessary.

As one can ascertain from FIG. 2, the bare fiber portion as shown in dashed line is inserted into the channel 22. The end of the fiber designated by reference numeral 50 protrudes from the aperture and extends from the projecting surrounding flange 21. The body of the bare fiber is secured within the channel 22 by means of a heat curable epoxy or other material. The projecting end of the fiber is then broken or severed by hand or otherwise at the top surface of the projecting flange. The next step in the operation is now to polish or grind away the projecting flange 21 after the bare optical fiber has been securely emplaced within channel 22.

It is important to note that the entire insert 20 is fabricated from a material which has compatible polishing and thermal expansion properties to that of the material of the fiber. Thus, in the case of a glass fiber the insert may be fabricated from a mica glass filled type of material. Such materials as a glass-bonded mica or a mica-filled ceramic material are available from many sources. The material is completely moldable and hence the entire insert 20 can be fabricated by any conventional molding process, e.g., compression molding. The material employed is sometimes referred to as a mica glass. Examples of such materials are available from a company by the name of Mykroy/Mycalex of 125 Clifton Blvd., Clifton, N.J.

The mica glass material or the glass-bonded mica material has a specific gravity of between 2.5 to 2.8, a density of between 0.09 to 0.10, has modulus of elasticity in tension of between 10 to $12 \times 10^6$ psi with a hardness on the Rockwell scale of 90 and a hardness on the Brinell scale of 56. As one can ascertain, the above-noted company as well as others maintain full specification sheets regarding this material.

The material offers distinct and unique advantages over other materials employed for such inserts which advantages are completely compatible with the structure of the insert as shown. The material possesses very similar properties to that of glass such as its physical and thermal properties. Hence, fabricating the above described insert with such a material eliminates many of the problems of the prior art.

It must be pointed out at this juncture that materials other than glass-bonded mica or mica filled ceramic may be used to form the insert. Thus, engineering plastics or other formable (e.g., moldable) materials exhibiting the desired polishing and thermal characteristics (e.g., in the case of a glass optical fiber the characteristics of glass-bonded mica or mica filled ceramic) may be used. Such materials need not necessarily exhibit the particular hardness of glass-bonded mica or mica filled ceramic. Examples of suitable engineering plastics are as follows: liquid crystal polymer (LCP), polyetheretherketone (PEEK), polyetherimide, polysulfone (PS), polyamide-imide, polyphenylene sulfide (PPS), polyethersulfone (PES), and polyarylate. Typical properties of such materials are: specific gravity 1.3–1.85, flexural modulus (PSI±1,000,000) 0.7–4.6, and hardness (Rockwell M Scale) 66–107. In the case of a glass fiber an insert may be formed of a blend or matrix of any of the foregoing engineering plastics and glass and mica to provide the desired polishing and thermal characteristics of glass. In the case of a plastic fiber the insert may be formed of any of the foregoing engineering plastics per se. The molding of the insert material can be effected by any suitable conventional technique, e.g., injection molding, compression molding, etc.

A major aspect of the insert structure involves the use of the circular extending flange 21 which surrounds the optical fiber. As indicated, this flange functions to provide a dual purpose. A first function of the flange is to allow the optical fiber to protrude above the front surface 26 as shown for example in FIG. 2 and then one merely breaks the optical fiber by hand or any other means. If the optical fiber breaks below the flange surface it is not a problem as it will break above the front surface 26 of the insert. The next step in the procedure is to polish away the flange 21 after the optical fiber has been secured within the channel. This is accomplished by a typical grinding or polishing technique. In this manner, one is assured that the optical fiber will have a flat face at the surface 26 of the insert.

Due to the polishing technique, the optical fiber can be accurately polished so that it has a completely smooth and flat surface. The above-noted material, namely, the glass mica material has completely compatible characteristics with glass. In this manner, particles which are generated during the polishing or grinding technique cannot in any manner affect, scratch or otherwise distort the surface of the optical fiber. This is important and the technique prevents contamination or destruction of the polished optical surface of the fiber while further assuring that no contamination of the optical fiber materials can occur. Thus the glass and mica alloy polishes relatively like glass and the debris generated is glass-like so no fiber damage can occur as would occur by using steel or other metallic inserts. Thus, by the above-noted technique, one produces a uniform smooth surface by means of the extending flange 21 in that during the polishing procedure the flange is removed thus assuring a flat uniform fiber surface which is simple to produce. The glass surface of the optical fiber is co-planar with the front surface of the insert 26 as polished and smoothed.

Referring to FIG. 3, there is shown an alternate embodiment of a different type of connector. The same principles apply. As one can see from FIG. 3, the insert 50 has the front surface with the projecting flange 51 associated with the internal channel 52 for accommodating the fiber. A portion of the fiber 53 is also included within the hollow recess of the insert. The insert has tapered walls and is a completely different configuration from the insert shown in FIG. 2. The tapered walls as well as the flat outer portions of the insert of FIG. 3 allow the outer plastic ferrule 54 to be molded. During the molding process, the channel 52 is geometrically located with respect to the center of the molded plastic ferrule 54. The plastic ferrule 54 as the ferrule 40 may be fabricated from typical engineering plastic-like material which may be a liquid crystal polymer or any other material capable of being molded.

In this manner, the mica-glass inserts 20 and 50, are molded into the associated plastic ferrule as 30 and 54. These ferrules can maintain any particular shape and be of any geometrical cross section as is true of the inserts 20 and 50.

FIGS. 4 to 7 show respective views of the insert assembly shown in FIG. 2 in more detail and utilizing some different reference numerals for the various features of the insert. As one can ascertain from the side plan view of FIG. 5, the insert again is fabricated from a material, e. g., mica glass, as above described and has a front projecting concentric flange 60 which is coextensive with the front surface 65 of the front section 61. The outside diameter of section 61 is approximately the same as that of the ferrule used in a straight type connector.

An output port or aperture 70 from which the inserted fiber projects is coextensive with an internal channel 64 to accommodate the unsheathed portion of the fiber. The anchoring means in regard to FIG. 5 consists of a peripheral recess 62 which is coextensive with a cylindrical tapered body portion 63. As seen in FIG. 5, the dashed line section associated with portion 63 accommodates the sheather fiber wherein the channel 64 accommodates the unsheathed fiber. Body portion 63 may be of smaller outside diameter than section 61 and may be shorter in length than shown in FIG. 5.

FIG. 4 shows a front view of the insert apparatus of FIG. 5.

FIG. 6 depicts a cross-sectional view taken through line A—A of FIG. 4 to show the internal construction of the insert.

FIG. 7 is an enlarged view of the circled section depicted in FIG. 5. As one will ascertain, the entire insert is extremely small and typically the length of the insert designated by dimension A is typically 8 millimeters. The length of channel 64 for example is typically 3 millimeters. The height of the projecting flange 60 is typically 0.25 millimeters with the front surface 65 having a diameter of approximately 1.75 millimeters with the diameter of the projecting flange 60 being of a diameter of 0.127 millimeters. Also, as one can ascertain from FIG. 6, the projecting flange 60 has sloping sides which are fabricated at an angle of about 15°.

The above-noted dimensions are given by way of example, but these are typical for currently existing fibers.

As one can ascertain from FIGS. 4–7, there is shown the insert which is fabricated from a glass-type mica or another material which has compatible characteristics with the material, e.g., glass, forming the fiber in regard to the fact that the material may be polished and will have a polishing characteristic like that of the fiber. In this manner, as the flange 60 is polished or ground down, the fiber which is included within the aperture or channel 64 is also polished accordingly at the same rate therefore assuring a smooth optical surface at the front surface 65 of the insert.

It is further indicated that the insert before accommodating the fiber has a plastic surrounding ferrule implemented, e.g., molded, thereon by the following technique.

Referring to FIG. 8, there is shown a front plan partial view of a typical mold 80. The mold 80 has an upstanding circular flange 81 which is dimensioned according to the length of the particular plastic ferrule. Located in the exact geometric center of the mold is a pin 82. The pin 82 is dimensioned so that it can accommodate and is completely surrounded by fiber accommodating insert channel 64. In this manner, the channel 64 of the insert is placed over the pin 82. Since the pin 82 is in the exact geometric center of the circular mold 81, it is always assured that the aperture 70 is exactly in the geometrical center of the plastic ferrule to be molded. This is completely independent of any asymmetry which may exist in the molding process associated with the fabrication of the glass mica insert. In this manner, the entire insert in regard to the optical fiber accommodating channel 60 is geometrically aligned with the surrounding plastic ferrule material. It must be pointed out at this juncture that the insert may be held at the centered position within the mold cavity by any suitable means, in lieu of the pin B2, so long as the channel of the insert is in the geometric center of the portion of the mold forming the ferrule around the insert.

It is noted that the insert can take on various geometrical configurations and while circular cross sections have been shown, it is understood that any other type of geometrical cross section can be employed. It is the main common attributes of all the inserts that they be fabricated from a material which is completely compatible with the material forming the fiber. An example of one suitable material has been referred to as a mica glass or a glass bonded mica material.

Each of the inserts is characterized by the following. Each insert as depicted in the Figs. has a large front surface which has a central aperture which eventually will be the output port or aperture for the accommodated optical fiber. The output aperture is directed through an extending flange which is integrally formed on the front surface and which is polished away once the optical fiber is accommodated within the internal channel associated with and terminating in the output aperture. Each of the inserts has suitable anchoring means to allow the insert to be employed in conjunction with a mold whereby a plastic ferrule is then molded about the insert so that the output port or output aperture is always in the exact geometric center of the ferrule. The polishing of the unit is accommodated simply without contamination of the optical fiber face due to the fact that the material that the insert is fabricated from is completely compatible with the glass as being a mica glass or mica glass-filled ceramic material as further indicated in the specification herein.

Thus, as indicated above and as one can ascertain, there are virtually many alternate embodiments which can be formulated without departing from the spirit and scope of the above-noted structure.

Without further elaboration the foregoing will so fully illustrate our invention that others may, by applying current or future knowledge, adopt the same for use under various conditions of service.

We claim:

1. Insert apparatus having a channel for accommodating an optical fiber formed of a first material, said fiber having a face, said apparatus comprising a tubular member fabricated from a second material, different than said first material, exhibiting compatible polishing and thermal properties with that of said first material to enable polishing of said fiber face when said fiber is accommodated in said channel of said insert, said second material of said insert comprising a material which polishes at relatively the same rate as said first material and which when polished produces debris which is similar in abrasiveness to said first material so as to be incapable of damaging said optical fiber face, said insert having a front surface of a given size and shape and having an aperture coextensive with said fiber accommodating channel to enable said fiber to be placed in said channel with the face of said fiber fixedly positioned at said front surface and polished at said front surface to produce an optically smooth and flat fiber surface, said optically smooth and flat fiber surface being in the same exact plane as said front surface of said insert due to the combined simultaneous polishing of said fiber face and said front surface of said insert.

2. The insert apparatus of claim 1 additionally comprising anchoring means for rigidly securing said insert apparatus to a surrounding ferrule.

3. The insert apparatus of claim 1 wherein said fiber is a glass fiber.

4. The insert apparatus of claim 3 wherein said second material is selected from a mica-glass material or a mica-filled ceramic material.

5. The insert apparatus of claim 3 wherein said second material comprises an engineering plastic.

6. The insert apparatus of claim 5 wherein said engineering plastic is glass and mica filled.

7. The insert apparatus of claim 2 wherein said ferrule is tubular and of cylindrical cross section and surrounds at least a portion of said tubular member, said ferrule having a longitudinal central axis, said aperture in said insert being concentric with said ferrule.

8. The insert apparatus of claim 7 wherein said ferrule comprises an engineering plastic.

9. The insert apparatus of claim 8 wherein said engineering plastic is a liquid crystal polymer plastic.

10. The insert apparatus of claim 1 additionally comprising an annular flange located on said front surface of said tubular member contiguous with and surrounding said aperture, said flange being of smaller outside diameter than that of said tubular member and providing a polishing reference surface to enable said flange to be polished away with said fiber positioned within said aperture to provide said optically smooth and flat surface.

11. The insert apparatus of claim 10 wherein said annular flange comprises a tapered peripheral sidewall.

12. The insert apparatus of claim 10 additionally comprising anchoring means for rigidly securing said insert apparatus to a surrounding ferrule.

13. The insert apparatus of claim 1 wherein said first material is formable to facilitate the fabrication of said tubular member.

14. The insert apparatus of claim 12 wherein said first material is moldable.

15. The insert apparatus of claim 2 wherein said tubular member has a front section and an integral rear section, said front section being a given length and a given outer diameter, said rear section being of a lesser outer diameter and having a channel coextensive with said fiber accommodating channel through which said optical fiber passes.

16. The insert apparatus of claim 15 wherein said rear section of said tubular member comprises said anchoring means.

17. The insert apparatus of claim 16 wherein said anchoring means comprises a flared portion of said rear section.

18. The insert apparatus of claim 17 wherein said channel in said rear section is of a larger inner diameter than said channel in said front section to accommodate a sheathing layer of said optical fiber.

* * * * *